(12) United States Patent
Song et al.

(10) Patent No.: US 11,695,249 B2
(45) Date of Patent: Jul. 4, 2023

(54) FEMTOSECOND PULSE LASER APPARATUS

(71) Applicant: ELECTRONICS AND TELECOMMUNICATIONS RESEARCH INSTITUTE, Daejeon (KR)

(72) Inventors: Dong Hoon Song, Daejeon (KR); Hong-Seok Seo, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 31 days.

(21) Appl. No.: 17/393,655

(22) Filed: Aug. 4, 2021

(65) Prior Publication Data
US 2022/0181838 A1   Jun. 9, 2022

(30) Foreign Application Priority Data

Dec. 4, 2020 (KR) .................... 10-2020-0168789
Jul. 15, 2021 (KR) .................... 10-2021-0093066

(51) Int. Cl.
*H01S 3/1115* (2023.01)
*H01S 3/106* (2006.01)
(Continued)

(52) U.S. Cl.
CPC .......... *H01S 3/1115* (2013.01); *H01S 3/0816* (2013.01); *H01S 3/09415* (2013.01);
(Continued)

(58) Field of Classification Search
CPC ................ H01S 3/1115; H01S 3/0816; H01S 3/094096; H01S 3/09415; H01S 3/10053;
(Continued)

(56) References Cited

U.S. PATENT DOCUMENTS 3,624,544 A * 11/1971 De Maria ............. H01S 3/1115
372/18
4,815,802 A * 3/1989 Nakamura ............. G02F 1/335
333/145
(Continued)

FOREIGN PATENT DOCUMENTS

CN        109193329 A      1/2019
CN        110120622 A      8/2019
(Continued)

OTHER PUBLICATIONS

Bulent Oktem et al., "Soliton-similariton fibre laser", Nature Photonics, vol. 4, May 2010.
(Continued)

*Primary Examiner* — Xinning(Tom) Niu
(74) *Attorney, Agent, or Firm* — LRK Patent Law Firm

(57) ABSTRACT

A femtosecond pulse laser apparatus includes a pump light source configured to provide a pump light, a gain medium configured to obtain a gain of a laser light using the pump light, a first curved mirror and a second curved mirror, which are provided at both sides of the gain medium, an output mirror configured to transmit a portion of the laser light and reflect the other portion of the laser light to the gain medium, a mode locking portion configured to generate a femtosecond pulse of the laser light, and an acoustic wave generator configured to provide an acoustic wave into the gain medium so as to adjust self-phase modulation of the laser light.

17 Claims, 5 Drawing Sheets

(51) Int. Cl.
*H01S 3/0941* (2006.01)
*H01S 3/10* (2006.01)
*H01S 3/16* (2006.01)
*H01S 3/131* (2006.01)
*H01S 3/081* (2006.01)
*H01S 3/094* (2006.01)
*H01S 3/13* (2006.01)

(52) U.S. Cl.
CPC .... *H01S 3/094096* (2013.01); *H01S 3/10053* (2013.01); *H01S 3/1068* (2013.01); *H01S 3/1305* (2013.01); *H01S 3/1312* (2013.01); *H01S 3/1625* (2013.01); *H01S 3/1636* (2013.01)

(58) Field of Classification Search
CPC .... H01S 3/1068; H01S 3/1305; H01S 3/1312; H01S 3/1625; H01S 3/1636; H01S 3/102; H01S 2301/03; H01S 3/1307
See application file for complete search history.

(56) References Cited

U.S. PATENT DOCUMENTS

| | | |
|---|---|---|
| 5,701,327 A | 12/1997 | Cunningham et al. |
| 5,734,503 A | 3/1998 | Szipocs et al. |
| 5,799,025 A * | 8/1998 | Lai ............... H01S 3/1112 372/18 |
| 6,363,090 B1 * | 3/2002 | Wintner ........ H01S 3/1112 372/18 |
| 6,370,166 B1 | 4/2002 | Akaoka et al. |
| 8,953,651 B2 | 2/2015 | Karavitis |
| 9,431,785 B2 | 8/2016 | Song et al. |
| 9,438,002 B2 | 9/2016 | Song et al. |
| 10,433,734 B2 | 10/2019 | Masumura |
| 2005/0121629 A1 * | 6/2005 | Unterrainer ......... H01S 3/08036 250/504 R |
| 2013/0089119 A1 * | 4/2013 | Kopf ................... H01S 3/091 372/69 |
| 2015/0288126 A1 * | 10/2015 | Song .................. H01S 3/08068 359/346 |

FOREIGN PATENT DOCUMENTS

| | | |
|---|---|---|
| JP | 1994-152015 A | 5/1994 |
| JP | 2000091681 A | 3/2000 |
| JP | 2014166360 A | 9/2014 |
| KR | 10-2011-0023385 A | 3/2011 |
| KR | 10-2012-0106282 A | 9/2012 |
| KR | 10-1219444 B1 | 1/2013 |
| KR | 10-2014-0044601 A | 4/2014 |

OTHER PUBLICATIONS

C. V. Shank et al., "Subpicosecond kilowatt pulses from a mode-locked cw dye laser", Applied Physics Letter, vol. 24, No. 8, Apr. 15, 1974.

D. E. Spence et al., "60-fsec pulse generation from a self-mode-locked Ti:sapphire laser", Optics Letters, vol. 16, No. 1, Jan. 1, 1991.

Donna Strickland et al., "Compression of Amplified Chirped Optical Pulses", Optics Communications, vol. 56, No. 3, Dec. 1, 1985.

D H Song et al., "A compact Kerr-lens mode-locked Ti:sapphire oscillator with 330 nJ soliton-like pulses", Laser Physics Letters, 10 (2013).

* cited by examiner

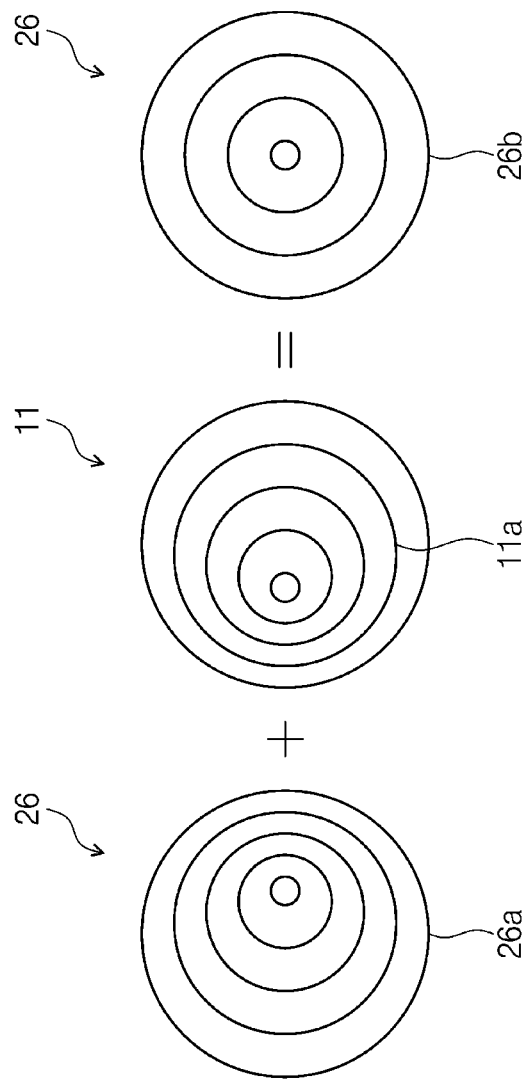

FEMTOSECOND PULSE LASER APPARATUS

CROSS-REFERENCE TO RELATED APPLICATIONS

This U.S. non-provisional patent application claims priority under 35 U.S.C. § 119 of Korean Patent Application Nos. 10-2020-0168789, filed on Dec. 4, 2020, and 10-2021-0093066, field on Jul. 15, 2021, the entire contents of which are hereby incorporated by reference.

BACKGROUND

1. Field of the Invention

The present disclosure herein relates to a laser apparatus, and more particularly, to a femtosecond pulse laser apparatus.

2. Description of Related Art

After the laser apparatus is invented in the 1960s, full-scale studies on the industrial application of the laser apparatus have been began from the 1970s. A $CO_2$ laser apparatus developed in 1980 is being used in various fields such as industrial, medical, communication, and display fields. A solid laser such as a diode laser that is developed later has been used in a wider range of fields than the $CO_2$ laser. Recently, a laser apparatus has been widely used in manufacturing industry fields, medical fields, academic fields, and cultural fields.

SUMMARY

The present disclosure provides a femtosecond pulse laser apparatus that is capable of equalizing and/or homogenizing a non-linear optical effect of laser light.

An embodiment of the inventive concept provides a femtosecond pulse laser apparatus. The femtosecond pulse laser apparatus includes: a pump light source configured to provide a pump light; a gain medium configured to obtain a gain of a laser light using the pump light; a first curved mirror and a second curved mirror, which are provided at both sides of the gain medium to reflect the laser light into the gain medium; an output mirror configured to transmit a portion of the laser light reflected by the second curved mirror and reflect the other portion of the laser light to the gain medium; a mode locking portion configured to generate a femtosecond pulse using a locking mode of the laser light reflected by the first curved mirror; and an acoustic wave generator connected to the gain medium and configured to provide an acoustic wave into the gain medium so as to a adjust self-phase modulation of the laser light.

In an embodiment, the femtosecond pulse laser apparatus may further include a first pad electrode and a second pad electrode, which are provided on and under the gain medium to connect the acoustic wave generator into the gain medium.

In an embodiment, the femtosecond pulse laser apparatus may further include: a wavefront sensor configured to detect a first wavefront of the laser light; an adaptive window provided between the pump light source and the first curved mirror and configured to partially adjust a second wavefront of the pump light; and a controller connected to the wavefront sensor and the adaptive window to distinguish the first wavefront of the laser light, the controller configured to adjust the second wavefront of the pump light in the adaptive window, based on the first wavefront.

In an embodiment, the adaptive window may include a liquid crystal panel.

In an embodiment, the femtosecond pulse laser apparatus may further include a convex lens disposed between the first curved mirror and the adaptive window to focus the pump light to the gain medium.

In an embodiment, the femtosecond pulse laser apparatus may further include a first flat mirror provided between the second curved mirror and the wavefront sensor.

In an embodiment, the first curved mirror may include a dichroic curved mirror.

In an embodiment, the gain medium and the mode locking portion may generate a positive self-phase modulation, and the acoustic wave generator may provide the acoustic wave into the gain medium to generate a negative self-phase modulation that compensates the positive self-phase modulation.

In an embodiment, the pump light source may include: a first laser diode configured to generate first pump light; a second laser diode configured to generate second pump light having a wavelength shorter than that of the first pump light; and a third laser diode configured to generate third pump light having a wavelength shorter than that of the second pump light.

In an embodiment, the first pump light may have a wavelength of 525 nm, the second pump light may have a wavelength of 491 nm, and the third pump light may have a wavelength of 471 nm.

In an embodiment, the pump light source may further include: a first beam splitter between the first laser diode and the second laser diode; and a second beam splitter between the second laser diode and the third laser diode.

In an embodiment, the pump light source may further include aspherical lenses between the first to third laser diodes and the first and second beam splitters.

In an embodiment, the pump light source may further include cylindrical lenses adjacent to the third laser diode.

In an embodiment, the cylindrical lenses may include: a concave cylindrical lens configured to enlarge the pump light; and a convex cylindrical lens configured to collimate the pump light.

In an embodiment, the gain medium may include a titanium sapphire crystal.

In an embodiment, the femtosecond pulse laser apparatus may further include a second flat mirror provided between the second curved mirror and the output mirror.

In an embodiment, the femtosecond pulse laser apparatus may further include a third flat mirror provided between the first curved mirror and the mode locking portion.

In an embodiment, the mode locking portion may include a saturated absorber.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5 is a diagram illustrating a first wavefront of laser light 26 and a second wavefront of pump light of FIG. 1.

DETAILED DESCRIPTION

Figure 1:
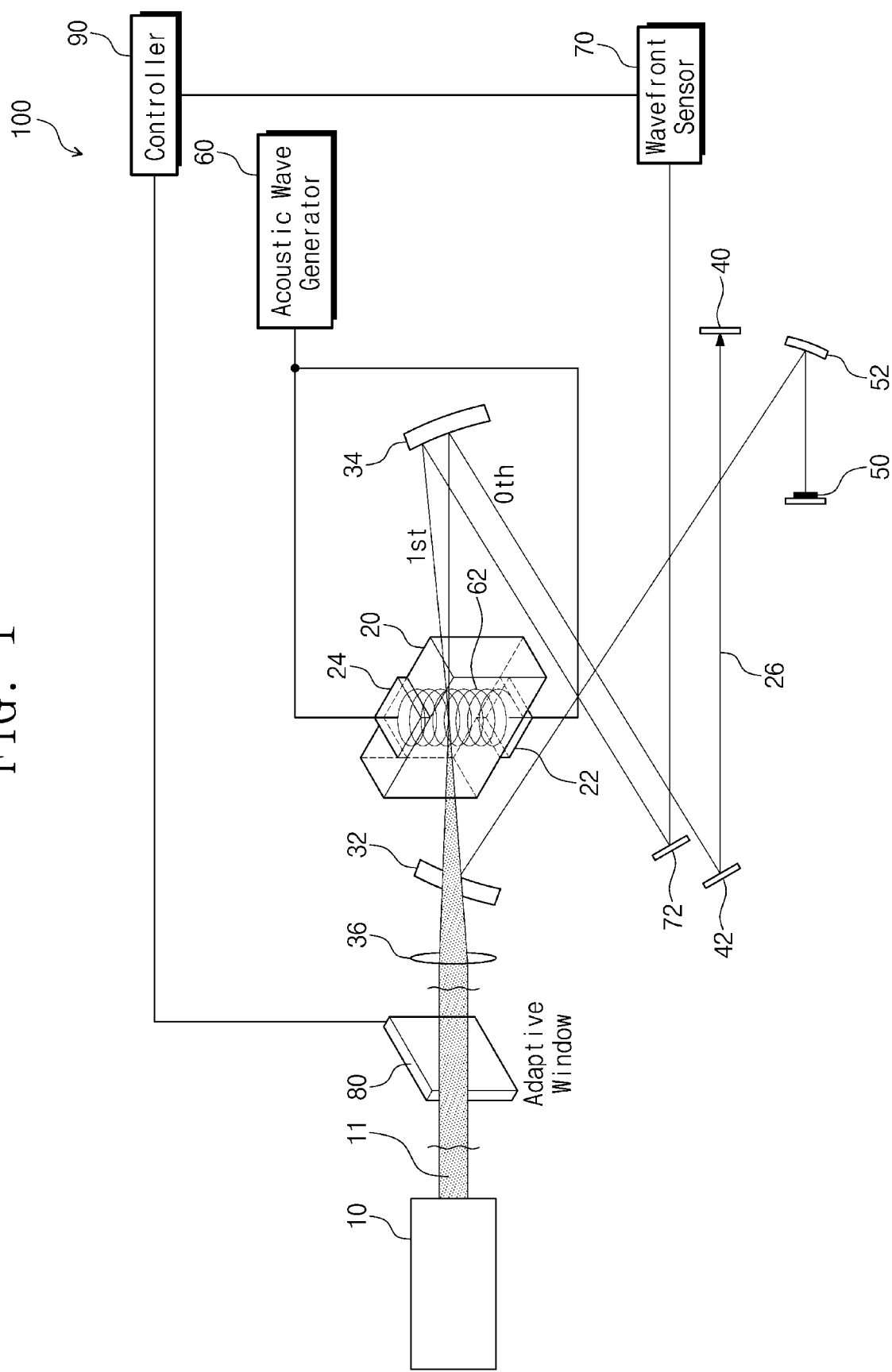
FIG. 1 is a diagram illustrating an example of a femtosecond pulse laser apparatus according to an embodiment of the inventive concept.

Embodiments of the present invention will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, the embodiments introduced herein are provided so that the disclosed contents may be thorough and complete, and the spirit of the present invention may be sufficiently conveyed to those skilled in the art, and the present invention is only defined by the scope of the claims. Like reference numerals refer to like elements throughout.

In the following description, the technical terms are used only for explaining a specific embodiment while not limiting the present invention. In this specification, the terms of a singular form may include plural forms unless specifically mentioned. The meaning of 'comprises' and/or 'comprising' specifies a component, a step, an operation and/or an element does not exclude other components, steps, operations and/or elements. Also, in the specification, femtosecond, pulse, self-phase modulation, and mode locking may be understood as meanings mainly used in optical and communication fields. Since it is according to a preferred embodiment, reference numerals presented in the order of description are not necessarily limited to the order.

The contents described above are specific examples for carrying out the embodiment of the inventive concept. The present disclosure will include not only the embodiments described above, but also embodiments that are changeable in design or easily changed. In addition, the present disclosure will also include technologies that are capable of being easily modified and implemented in the future using the foregoing embodiments.

FIG. 1 is a diagram illustrating an example of a femtosecond pulse laser apparatus 100 according to an embodiment of the inventive concept.

Referring to FIG. 1, a femtosecond pulse laser device 100 according to an embodiment of the inventive concept may be a Kerr lens self-mode-locked laser. For example, the femtosecond pulse laser device 100 according to an embodiment of the inventive concept may include a pump light source 10, a gain medium 20, a first curved mirror 32, a second curved mirror 34, an output mirror 40, a mode locking portion 50, an acoustic wave generator 60, a wavefront sensor 70, an adaptive window 80, and a controller 90. The pump light source 10 may generate pump light 11 to provide the pump light 11 into the gain medium 20. The gain medium 20, the first curved mirror 32, the second curved mirror 34, the output mirror 40, the mode locking portion 50, the acoustic wave generator 60, the wavefront sensor 70, the adaptive window 80, and the controller 90 may function as a resonator that generates the laser light 26 using the pump light 11.

Figure 2:
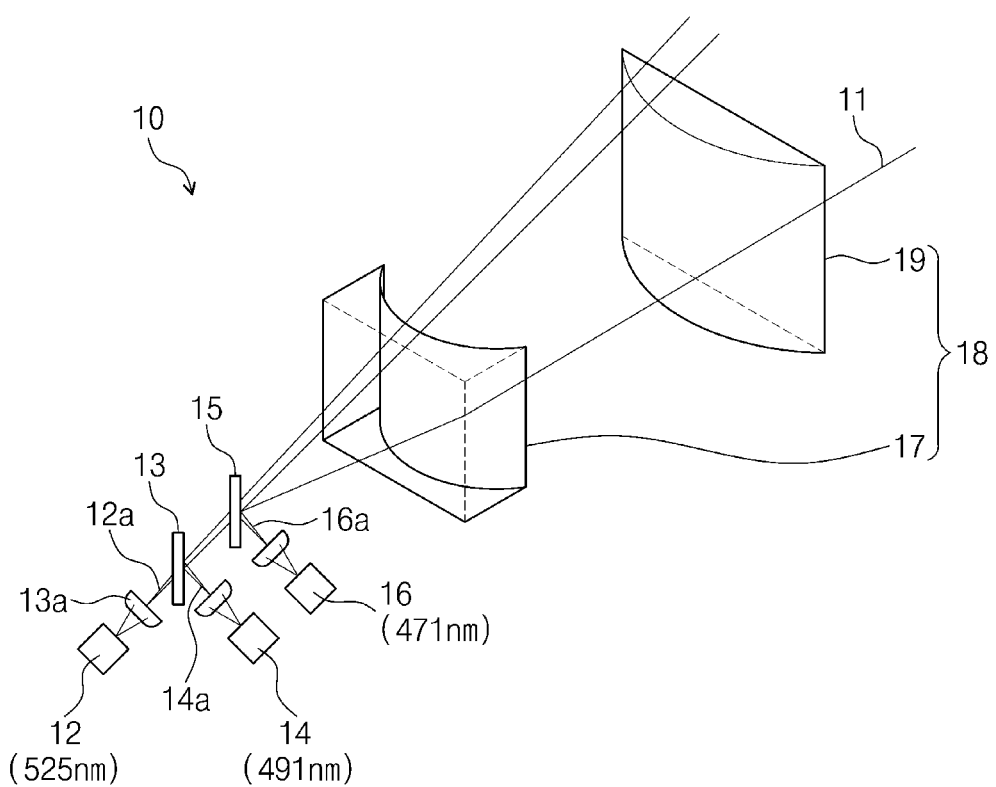
FIG. 2 is a diagram illustrating an example of a pump light source of FIG. 1.

FIG. 2 is a plan diagram illustrating an example of the pump light source 10 of FIG. 1.

Referring to FIG. 2, the pump light source 10 may include a first laser diode 12, a second laser diode 14, a third laser diode 16, and cylindrical lenses 18.

The first laser diode 12 may generate first pump light 12a. For example, the first pump light 12a may have a wavelength of about 525 nm. The first pump light 12a may include green laser light.

The second laser diode 14 may generate second pump light 14a. The second pump light 14a may have a wavelength shorter than that of the first pump light 12a. For example, the second pump light 14a may have a wavelength of about 491 nm. The second pump light 14a may include sky blue laser light.

A first beam splitter 13 may be provided between the second laser diode 14 and the first laser diode 12. The first beam splitter 13 may transmit the first pump light 12a and reflect the second pump light 14a. Aspherical lenses 13a may be provided between the first laser diode 12 and the first beam splitter 13 and between the second laser diode 14 and the first beam splitter 13. The aspherical lenses 13a may collimate the first pump light 12a and the second pump light 14a.

The third laser diode 16 may generate third pump light 16a. The third pump light 16a may have a wavelength shorter than that of the second pump light 14a. The third pump light 16a may have a wavelength of about 471 nm. The third pump light 16a may include blue laser light.

A second beam splitter 15 may be provided between the third laser diode 16 and the first beam splitter 13. The second beam splitter 15 may transmit the first pump light 12a and the second pump light 14a and may reflect the third pump light 16a. An aspherical lens 13a may be provided between the third laser diode 16 and the second beam splitter 15. The aspherical lens 13a may collimate the third pump light 16a.

The cylindrical lenses 18 may be provided to be adjacent to the second beam splitter 15. Although not shown, the cylindrical lenses 18 may be provided between the second beam splitter 15 and the adaptive window 80. The cylindrical lenses 18 may magnify the pump light 11. The pump light 11 may be provided on a sidewall of the gain medium 20. For example, the cylindrical lenses 18 may include a first cylindrical lens 17 and a second cylindrical lens 19.

The first cylindrical lens 17 may be provided between the second beam splitter 15 and the second cylindrical lens 19. The first cylindrical lens 17 may include a concave cylindrical lens. The first cylindrical lens 17 may enlarge and/or expand the pump light 11.

The second cylindrical lens 19 may be provided at the other side of the first cylindrical lens 17, which faces the second beam splitter 15. The second cylindrical lens 19 may include a convex cylindrical lens. The second cylindrical lens 19 may collimate the pump light 11.

Referring again to FIG. 1, the gain medium 20 may be provided between the first curved mirror 32 and the second curved mirror 34. The gain medium 20 may receive the pump light 11 to obtain a gain of the laser light 26. In addition, the gain medium 20 may scatter and/or diffract the laser light 26. The gain medium 20 may have a rectangular parallelepiped shape. The gain medium 20 may include a titanium sapphire crystal.

The first curved mirror 32 may be provided at one side of the gain medium 20. The first curved mirror 32 may transmit the pump light 11 and reflect the laser light 26 to the gain medium 20 and the mode locking portion 50. For example, the first curved mirror 32 may include a dichroic curved mirror.

A convex lens 36 may be provided between the first curved mirror 32 and the pump light source 10. The convex lens 36 may focus the pump light 11 on the gain medium 20 to improve generation efficiency of the laser light 26.

The second curved mirror 34 may be provided at the other side of the gain medium 20. The second curved mirror 34 may reflect a portion (e.g., 0th-order diffracted light 0th) of the laser light 26 to the gain medium 20 and the output mirror 40. In addition, the second curved mirror 34 may reflect a portion (e.g., first-order diffracted light 1st) of the laser light 26 to the gain medium 20 and the wavefront sensor 70.

The output mirror 40 may transmit a portion of the laser light 26 provided from the gain medium 20, and the output mirror 40 may reflect another portion of the laser light 26 back to the gain medium 20 to resonate and/or generate the laser light 26. For example, the output mirror 40 may include a half mirror, but an embodiment of the inventive concept is not limited thereto.

A first flat mirror 42 may be provided between the output mirror 40 and the second curved mirror 34. The first flat mirror 42 may reflect the laser light 26 to the second curved mirror 34 and the output mirror 40.

Figure 3:
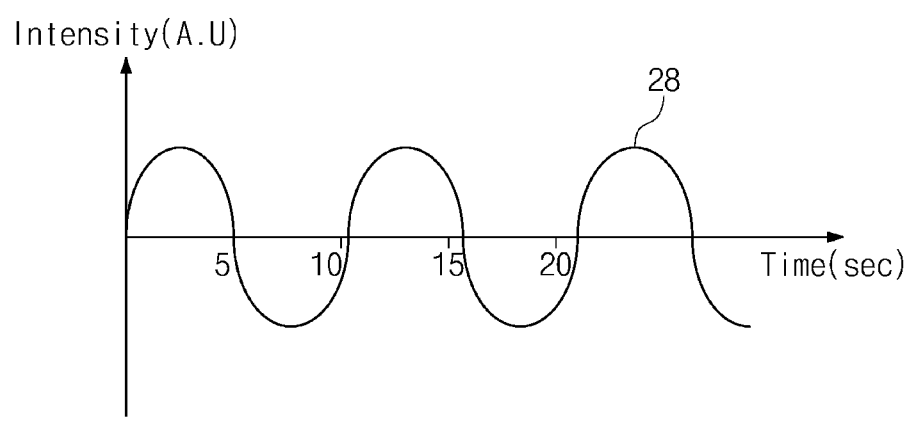
FIG. 3 is a graph illustrating an example of a femtosecond pulse of laser light generated by a mode locking portion of FIG. 1.

FIG. 3 is a illustrating an example of a femtosecond pulse 28 of the laser light 26 generated by the mode locking portion 50 of FIG. 1.

Referring to FIGS. 1 and 3, the mode locking portion 50 may receive the laser light 26 to generate the femtosecond pulse 28 of the laser light 26. For example, the femtosecond pulse 28 may have a period of about 10.7 nm. The mode locking portion 50 may include a saturated absorber. The saturated absorber may generate the femtosecond pulse 28 of the laser light 26 based on mode locking of a non-linear phenomenon. The mode locking may be induced by a non-linear optical Kerr effect. Also, the mode locking portion 50 may include a chirped mirror or a prism, but the embodiment of the inventive concept is not limited thereto. A third curved mirror 52 may be provided between the mode locking portion 50 and the first curved mirror 32. The third curved mirror 52 may reflect the laser light 26 to the mode locking portion 50 and the first curved mirror 32.

Figure 4:
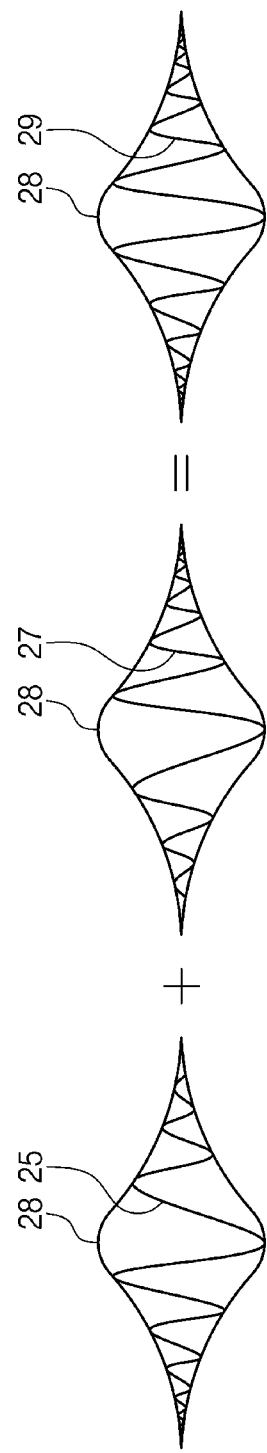
FIG. 4 is a diagram illustrating a positive self-phase modulation, a negative self-phase modulation, and a balanced self-phase modulation of the femtosecond pulse of FIG. 3.

FIG. 4 is a diagram illustrating a positive self-phase modulation 25, a negative self-phase modulation 27, and a balanced self-phase modulation 29 of the femtosecond pulse 28 of FIG. 3.

Referring to FIGS. 1 and 4, the gain medium 20 and the mode locking portion 50 may generate the positive self-phase modulation 25 of the laser light 26. The positive self-phase modulation 25 may be generated in the pump light source 10, the convex lens 36, the first curved mirror 32, the gain medium 20, and the second curved mirror 34, but the embodiment of the inventive concept is not limited thereto. The positive self-phase modulation 25 may be represented as a shape in which a phase of the laser light 26 within the femtosecond pulse 28 is tilted to a right side. In general, the positive self-phase modulation 25 shows that the non-linear optical effect of the laser light 26 within the gain medium 20 and/or the mode locking portion 50 is irregular or non-homogeneous. Although not shown, the gain medium 20, and the mode locking portion 50 may generate a positive dispersion value of the laser light 26.

The acoustic wave generator 60 may be connected to the gain medium 20. For example, the acoustic wave generator 60 may provide an acoustic wave 62 into the gain medium 20 to adjust the self-phase modulation of the laser light 26. The acoustic wave 62 may be provided in a direction perpendicular to the pump light 11 and the laser light 26. The acoustic wave 62 may be provided in a direction from an upper side to a lower side of gain medium 20. The acoustic wave 62 may have an audible frequency of about 20 Hz to about 20,480 Hz (20.48 KHz) and an inaudible frequency of 20 KHz or more. Alternatively, the acoustic wave 62 may include a photoacoustic wave, but the embodiment of the inventive concept is not limited thereto.

For example, the acoustic wave generator 60 may generate the negative self-phase modulation 27 of the laser light 26. The negative self-phase modulation 27 may be represented as a shape in which the phase of the laser light 26 within the femtosecond pulse 28 is tilted to a left side. The negative self-phase modulation 27 may compensate the positive self-phase modulation 25 to change the positive self-phase modulation 25 into a balanced self-phase modulation 29. In addition, the acoustic wave generator 60 may generate a negative dispersion value of the laser light 26 to compensate the positive dispersion value in the gain medium 20, and the mode locking portion 50, and the laser light 26, thereby improving the non-linear optical effect. That is, the acoustic wave generator 60 may provide the acoustic wave 62 into the gain medium 20 to equalize and/or homogenize the non-linear optical effect of the laser light 26.

Thus, the femtosecond pulse laser apparatus 100 according to an embodiment of the inventive concept may generate the femtosecond pulse 28 having the balanced self-phase modulation 29 of the non-linear optical effect.

A first pad electrode 22 and a second pad electrode 24 may be provided below and above the gain medium 20, respectively. The first pad electrode 22 and the second pad electrode 24 may connect the acoustic wave generator 60 to the gain medium 20. Each of the first pad electrode 22 and the second pad electrode 24 may include a metal such as gold (Au), silver (Ag), copper (Cu), aluminum (Al), or tungsten (W).

FIG. 5 is a diagram illustrating a first wavefront 26a of the laser light 26 and a second wavefront 11a of the pump light 11 of FIG. 1.

Referring to FIGS. 1 and 5, the wavefront sensor 70 may receive a portion of the laser light 26 from the second curved mirror 34 to detect the first wavefront 26a. For example, the first wavefront 26a may be a right-biased wavefront. The wavefront sensor 70 may include a CMOS image sensor or a CCD image sensor. Also, the wavefront sensor 70 may include a plurality of photodiodes, but the embodiment of the inventive concept is not limited thereto. A second flat mirror 72 may be provided between the wavefront sensor 70 and the second curved mirror 34. The second flat mirror 72 may reflect the laser light 26 to the wavefront sensor 70.

The adaptive window 80 may be provided between the pump light source 10 and the convex lens 36. The adaptive window 80 may partially control the second wavefront 11a of the pump light 11. When the first wavefront 26a is the right-biased wavefront, the second wavefront 11a may be a left-biased wavefront. For example, the adaptive window 80 may include a liquid crystal panel.

The controller 90 may be connected to the wavefront sensor 70 and the adaptive window 80. The controller 90 may distinguish the first wavefront 26a of the laser light 26 using a detection signal of the wavefront sensor 70. The controller 90 may control the second wavefront 11a of the pump light 11 to adjust the first wavefront 26a of the laser light 26 to an isotropic wavefront 26b.

Therefore, the femtosecond pulse laser apparatus 100 according to an embodiment of the inventive concept may obtain the laser light 26 having the isotropic wavefront 26*b*.

As described above, the femtosecond pulse laser apparatus according to an embodiment of the inventive concept may equalize and/or homogenize the non-linear optical effect of the laser light using the acoustic wave generator that provides the acoustic wave in the gain medium.

The contents described above are specific examples for carrying out the embodiment of the inventive concept. The present disclosure will include not only the embodiments described above, but also embodiments that are changeable in design or easily changed. In addition, the present disclosure will also include technologies that are capable of being easily modified and implemented in the future using the foregoing embodiments.

What is claimed is:

1. A femtosecond pulse laser apparatus comprising:
a pump light source configured to provide a pump light;
a gain medium configured to obtain a gain of a laser light using the pump light;
a first curved mirror and a second curved mirror, which are provided at both sides of the gain medium to reflect the laser light into the gain medium;
an output mirror configured to transmit a portion of the laser light reflected by the second curved mirror and reflect the other portion of the laser light to the gain medium;
a mode locking portion configured to generate a femtosecond pulse using a locking mode of the laser light reflected by the first curved mirror; and
an acoustic wave generator connected to the gain medium and configured to provide an acoustic wave into the gain medium so as to adjust a self-phase modulation of the laser light;
wherein the pump light source comprises:
a first laser diode configured to generate first pump light;
a second laser diode configured to generate second pump light having a wavelength shorter than that of the first pump light; and
a third laser diode configured to generate third pump light having a wavelength shorter than that of the second pump light.

2. The femtosecond pulse laser apparatus of claim 1, further comprising a first pad electrode and a second pad electrode, which are provided on and under the gain medium to connect the acoustic wave generator into the gain medium.

3. The femtosecond pulse laser apparatus of claim 1, further comprising:
a wavefront sensor configured to detect a first wavefront of the laser light;
an adaptive window provided between the pump light source and the first curved mirror and configured to partially adjust a second wavefront of the pump light; and
a controller connected to the wavefront sensor and the adaptive window to distinguish the first wavefront of the laser light, the controller configured to adjust the second wavefront of the pump light in the adaptive window based on the first wavefront.

4. The femtosecond pulse laser apparatus of claim 3, wherein the adaptive window comprises a liquid crystal panel.

5. The femtosecond pulse laser apparatus of claim 3, further comprising a convex lens disposed between the first curved mirror and the adaptive window to focus the pump light to the gain medium.

6. The femtosecond pulse laser apparatus of claim 3, further comprising a first flat mirror provided between the second curved mirror and the wavefront sensor.

7. The femtosecond pulse laser apparatus of claim 1, wherein the first curved mirror comprises a dichroic curved mirror.

8. The femtosecond pulse laser apparatus of claim 1, wherein:
the gain medium and the mode locking portion generate a positive self-phase modulation, and
the acoustic wave generator provides the acoustic wave into the gain medium to generate a negative self-phase modulation that compensates the positive self-phase modulation.

9. The femtosecond pulse laser apparatus of claim 1, wherein:
the first pump light has a wavelength of 525 nm,
the second pump light has a wavelength of 491 nm, and
the third pump light has a wavelength of 471 nm.

10. The femtosecond pulse laser apparatus of claim 1, wherein the pump light source further comprises:
a first beam splitter between the first laser diode and the second laser diode; and
a second beam splitter between the second laser diode and the third laser diode.

11. The femtosecond pulse laser apparatus of claim 10, wherein the pump light source further comprises aspherical lenses between the first to third laser diodes and the first and second beam splitters.

12. The femtosecond pulse laser apparatus of claim 1, wherein the pump light source further comprises cylindrical lenses adjacent to the third laser diode.

13. The femtosecond pulse laser apparatus of claim 12, wherein the cylindrical lenses comprise:
a concave cylindrical lens configured to enlarge the pump light; and
a convex cylindrical lens configured to collimate the pump light.

14. The femtosecond pulse laser apparatus of claim 1, wherein the gain medium comprises a titanium sapphire crystal.

15. The femtosecond pulse laser apparatus of claim 1, further comprising a second flat mirror provided between the second curved mirror and the output mirror.

16. The femtosecond pulse laser apparatus of claim 1, further comprising a third curved mirror provided between the first curved mirror and the mode locking portion.

17. The femtosecond pulse laser apparatus of claim 1, wherein the mode locking portion comprises a saturated absorber.

* * * * *